US006093785A

United States Patent [19]
Gordon et al.

[11] Patent Number: 6,093,785
[45] Date of Patent: Jul. 25, 2000

[54] INDANE POLYCARBONATES

[75] Inventors: Janet L. Gordon, Clifton Park; David G. Gascoyne, Schenectady, both of N.Y.

[73] Assignee: Molecular OptoElectronics Corporation, Watervliet, N.Y.

[21] Appl. No.: 09/236,717

[22] Filed: Jan. 25, 1999

Related U.S. Application Data

[63] Continuation of application No. 09/135,498, Aug. 17, 1998, which is a continuation of application No. 08/947,980, Oct. 9, 1997, abandoned, which is a continuation of application No. 08/798,756, Feb. 13, 1997, Pat. No. 5,703,197.

[51] Int. Cl.$^7$ ................................................... C08G 64/02
[52] U.S. Cl. .......................................... 528/196; 528/198
[58] Field of Search .................................... 528/196, 198

[56] References Cited

U.S. PATENT DOCUMENTS

| | | | |
|---|---|---|---|
| 2,979,534 | 4/1961 | Petropoulos et al. | 260/619 |
| 3,634,089 | 1/1972 | Hamb | 96/87 |
| 4,129,612 | 12/1978 | Serini et al. | 260/860 |
| 4,334,106 | 6/1982 | Dai | 568/719 |
| 4,734,482 | 3/1988 | Tamai et al. | 528/185 |
| 4,950,731 | 8/1990 | Faler et al. | 528/201 |
| 4,988,785 | 1/1991 | Paul et al. | 526/259 |
| 5,145,926 | 9/1992 | Patel et al. | 526/284 |
| 5,424,389 | 6/1995 | Wimberger Friedl et al. | 528/201 |

FOREIGN PATENT DOCUMENTS

| | | |
|---|---|---|
| 0 461 388 A1 | 12/1991 | European Pat. Off. |
| 0 621 297 A2 | 10/1994 | European Pat. Off. |
| 61148401 | 7/1986 | Japan . |
| 09006022 | 1/1997 | Japan . |
| 09258460 | 10/1997 | Japan . |
| 09302086 | 11/1997 | Japan . |

OTHER PUBLICATIONS

Brunelle et al., "Preparation of Bis(chloroformate)s for Use in Cyclization Reactions," *Polymer International* 37, 179–186 (1995).

D. J. Brunelle, "Transesterification Chemistry, Low Temperature Reactions of O–Nitrophenyl Carbonates," *Macromolecular Reports* A28(Suppl.2), 95–102 (1991).

J.C. Wilson, "Polyamides and Polyesters Derived from 1,1,3–Trimethyl–3–(p–aminophenyl)–5–inadanamine and 1,1,3–Trimethyl–3–(p–hydroxphenyl)–5–indanol," *J. Poly. Sci: Poly. Chem. Ed.* 13, 749–754 (1975).

K. C. Stueben, "Polymers Containing the 3,3,3',3'–Tetramethyl–1,1'–Spirobiindane Residue," *J. Pol. Sci: Part A* 3, 3209–3217 (1965).

J. C. Petropoulos and J. J Fisher, "The Dimers of Ring Substituted Alpha–Methylstyrenes," *J. Amer. Chem. Soc.* 80, 1938–41 (1958).

*Chem. Abstracts*, vol. 106, No. 20 (1987), abstract No. 166296, Ozawa et al., "Molded Parts for Optical Devices," JP61148401A (Jul. 7, 1986).

*Chem. Abstracts*, vol. 126, No. 13 (1997), abstract No. 179040, Ogawa et al., "Electrophotographic Photoreceptor Using Indane–type Polycarbonate Binder," JP09006022A (Jan. 10, 1997).

*Chem. Abstracts*, vol. 127, No. 25 (1997), abstract No. 352976, Itami et al., "Electrophotographic Photoreceptor and its Manufacture, Electrophotographic Image Formation and Apparatus Using It, and Apparatus Unit," JP09258460A (Oct. 3, 1997).

*Chem. Abstracts*, vol. 128, No. 6 (1997), abstract No. 61952, Ogawa et al., "Aromatic Polycarbonates with Modified Terminals and their Manufacture," JP09302086A (Nov. 25, 1997).

*Primary Examiner*—Terressa Boykin
*Attorney, Agent, or Firm*—Heslin & Rothenberg, P.C.; Martha L. Boden, Esq.

[57] ABSTRACT

Linear indane polycarbonate polymers, both homopolymers and copolymers derived from biphenols and bisphenols are disclosed. The indane polycarbonates have high glass transition temperatures and exhibit good mechanical properties, good thermal stability, and good ductility even at temperatures greater than 15° C. making them useful for high temperature processing applications. In addition, the clear indane polycarbonate compositions exhibit good optical properties.

4 Claims, No Drawings

INDANE POLYCARBONATES

CROSS REFERENCE TO RELATED APPLICATIONS

This application is a continuation of earlier copending U.S. patent application Ser. No. 09/135,498, filed Aug. 17, 1998, which is itself a continuation of U.S. patent application Ser. No. 08/947,980, filed Oct. 9, 1997 now abandoned, which is itself a continuation of U.S. patent application Ser. No. 08/798,756, filed Feb. 13, 1997, now issued as U.S. Pat. No. 5,703,197 on Dec. 30, 1997.

The following invention was made with Government support under contract number F33615-95-C-5432 awarded by the United States Air Force. The Government has certain rights in this invention.

FIELD OF THE INVENTION

The present invention relates to linear polycarbonates derived from indane bisphenols, including both homo- and copolycarbonates formed with biphenol or bisphenol derivatives. In particular, this invention relates to clear and ductile indane polycarbonates having high glass transition temperatures.

BACKGROUND OF THE INVENTION

Polycarbonates are well-known as excellent materials for optical applications because of their inherent toughness and clarity. The most familiar linear polycarbonates are homopolymers derived from 2,2-bis(4-hydroxyphenyl) propane, commonly known as bisphenol-A (hereinafter, BPA). These materials are transparent and exhibit excellent thermal and mechanical properties. One application for polycarbonates is the fabrication of optical materials such as lenses and substrates for optical storage media.

During manufacturing, the polymeric polycarbonate is typically molded at high temperatures and pressures which, upon cooling, may lead to molecular orientations and stresses that are frozen into the material. In such cases, the cooled polycarbonate becomes anisotropic and exhibits orientational birefringence. As a light ray passes through a birefringent material, it is split into two plane-polarized light rays, each having a plane of polarization extending in a perpendicular direction relative to the other. Each light ray has a different index of refraction in the polymer, and the difference between these indices of refraction is referred to as the birefringence of a material. Because light passing through a birefringent material follows more than one path, distortion of the light results. Thus, birefringence is an undesirable property for polymers used in optical applications. Ideally, materials used in optical applications should have a birefringence substantially equal to zero.

Wimberger Friedl et al. reported in U.S. Pat. No. 5,424, 389 and European Patent Application 0621297A2 that random copolycarbonates of BPA and 6,6'-dihydroxy-3,3,3',3'-tetramethyl-1,1'-spirobiindane (hereinafter, SBI), wherein the mole fraction of SBI varies from 0.844 to 0.887, show dramatic improvements in birefringence over BPA polycarbonate homopolymers, as measured by the stress-optical coefficient ($C_m$). The stress-optical coefficient ($C_m$) for a polymer is a measure of its sensitivity to orientational birefringence. Preferably, the absolute value of $C_m$ in polymers used in optical applications is substantially equal to zero. Likewise, Faler et al. disclosed in U.S. Pat. No. 4,950,731 that random SBI/BPA copolymers demonstrate improved optical properties as compared with BPA polycarbonates.

Although commercially available polycarbonate resins based solely on BPA exhibit excellent optical and mechanical properties, they are unsuitable for high temperature applications or further high temperature surface processing because the glass transition temperature ($T_g$) value for BPA polycarbonates is relatively low, approximately 150° C. Materials molded from BPA polycarbonates cannot withstand post-molding processing at temperatures greater than 150° C., such as the application of chemically resistant hard coats or thick surface coatings often used in optical applications. Thus, a higher $T_g$ is critical for molded resins that undergo additional high temperature processing to maintain the integrity of the molded part.

SBI homopolycarbonates exhibit a high $T_g$ (up to 230° C.), as disclosed in the aforementioned patent to Faler et al., but the mechanical strength and ductility of SBI materials are much reduced relative to the BPA polycarbonates. However, by adding and varying the amount of BPA monomer in spirobiindane (SBI) based polycarbonates, Faler et al. reported that the low $T_g$ of BPA polycarbonates can be counteracted. These SBI and BPA monomers used in combination produce copolymers with a higher $T_g$ but do not always retain the requisite toughness.

The present invention is based on the unexpected discovery that linear homopolymers derived from various indane bisphenols, as shown in the following structure (I), which are similar in structure to SBI homopolymers, demonstrate improved thermal behavior relative to BPA polycarbonates and improved ductility relative to SBI homopolycarbonates. The improvement in thermal properties and ductility is also observed in linear copolymers having a combination of the repeat units of structure (I) and the following structure (II). In addition, the clear indane homopolycarbonates and copolycarbonates bearing this combination show improved optical properties.

SUMMARY OF THE INVENTION

Accordingly, the polymers of this invention are linear indane polycarbonate polymers comprising structural units having the formulas

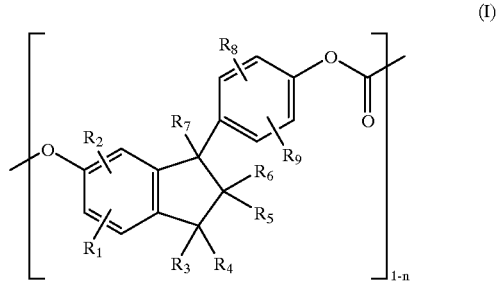

and

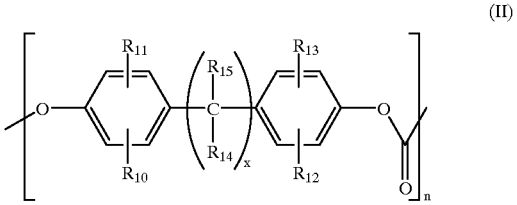

wherein n is the mole fraction of structure II and has a value from about 0 to 0.99; $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$ and $R_{15}$ are each independently hydrogen, deuterium, alkyl, cycloalkyl, alkenyl, cycloalkenyl, aryl, alkoxyaryl, alkylaryl, arylalkyl, alkoxy, alkoxyalkyl, aryloxyalkyl, haloalkyl, haloaryl, nitro, halogen, cyano, hydroxy, or deuterated equivalents thereof; and x is 0 or 1. As used herein, alkyl refers to linear or branched hydrocarbon residues of 1 to 20 carbons. Similarly, cycloalkyl refers to cyclic hydrocarbon residues of 3 to 20 carbons. Alkenyl refers to linear or branched unsaturated hydrocarbons of 2 to 20 carbons having at least one double bond, and cycloalkenyl includes cyclic unsaturated hydrocarbons of 4 to 20 carbons having at least one double bond. Aryl refers to moieties having the six-carbon ring structure characteristic of benzene or the condensed six-carbon rings of other aromatic derivatives such as naphthalene, phenanthrene, anthracene, etc. For example, an aryl group may be phenyl or naphthyl and may be substituted or unsubstituted. Deuterated equivalents thereof, as used herein, refers to the hydrocarbon moieties listed above for $R_1$ to $R_{15}$ in which at least one hydrogen is replaced with the deuterium isotope. For example, a deuterated methyl group may be $CDH_2$, $CD_2H$, or $CD_3$, and a deuterated ethyl may be $CH_3CD_2$.

The novel linear indane polycarbonate polymers of the present invention have improved thermal properties over commercially available polycarbonate resins based on BPA. The present indane polymers have higher $T_g$ values, which make them desirable because of their ability to withstand higher temperature processing. In addition, the novel indane homopolymers of the present invention provide an unexpected improvement in ductility over materials prepared from bisphenols with the spirobiindane structure. Surprisingly, the requisite mechanical strength of the materials is not sacrificed at high temperatures (>150° C.), as demonstrated by the retained integrity of the present compositions. Thus, the indane polymers of the present invention have high glass transition temperatures and exhibit good mechanical properties, good thermal stability, and good ductility even at temperatures greater than 150° C.

Like linear spirobiindane/bisphenol-A copolycarbonates, which demonstrate much improved optical properties over BPA polycarbonates, the clear linear indane polycarbonates of the present invention also show improved optical properties over commercially available materials.

DESCRIPTION OF THE PREFERRED EMBODIMENTS

This invention relates to novel linear indane polycarbonates having recurring structural units (I) and (II) in which $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, n, and x are defined above.

More particularly, the linear polycarbonate polymers of the present invention contain units of structure (I) derived from various indane bisphenols in which illustrative useful $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ substituents are hydrogen, alkyl such as methyl, ethyl, butyl, pentyl, octyl, nonyl, tert-butyl, neopentyl, isopropyl, sec-butyl, dodecyl, and the like; aryl such as phenyl; cycloalkyl such as cyclohexyl, cyclooctyl, cycloheptyl, cyclopentyl, and the like; alkoxyalkyl and aryloxyalkyl such as phenoxymethylene, phenoxyethylene, methoxymethylene, ethoxymethylene, methoxyethylene, butoxymethylene, propoxyethylene, and the like; arylalkyl such as phenylethyl, phenylpropyl, benzyl, and the like; and substituted alkyl and aryl groups such as cyanomethyl, 3-chloropropyl, 3,4-dichlorophenyl, 4-chloro-3-cyanophenyl, chloromethyl, dichloromethyl, trichloromethyl, fluoromethyl, difluoromethyl, trifluoromethyl, 4-nitrophenyl, phenoxyphenyl, 4-methylphenyl, 2,4-dimethylphenyl, 2-nitroethyl, nitromethyl, and the like. In addition, deuterated substituents $R_1$ to $R_{15}$ in which at least one hydrogen is replaced with the deuterium isotope may be employed. In many cases, the birefringence will be reduced by employing monomers in which at least one of $R_1$ to $R_{15}$ is other than hydrogen.

Because of its ease in preparation, a particularly preferred structural unit (I) is derived from 5-hydroxy-3-(4-hydroxyphenyl)-1,1,3-trimethylindane, wherein $R_1$, $R_2$, $R_5$, $R_6$, $R_8$, and $R_9$ are hydrogen, and $R_3$, $R_4$, and $R_7$ are methyl groups, as shown by the following structural formula (III)

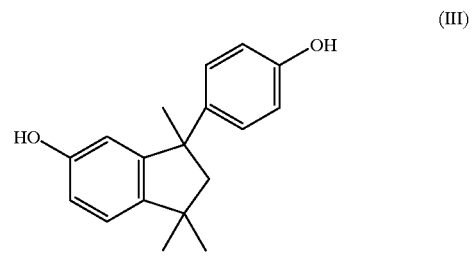

(III)

Both linear homopolycarbonates of stucture (I) and linear copolycarbonates containing the additional structure (II) are included in the present invention. The units of structure (II) may be derivatives of biphenol, wherein x is 0. Alternatively, x is 1 and structure (II) is a derivative of a bisphenol wherein a bridging carbon connects the phenol moieties. The $R_{10}$ to $R_{15}$ substituents are as previously defined. Due to its commercial availability, structure (II) is preferably a derivative of 2,2-bis(4-hydroxyphenyl) propane, commonly known as bisphenol-A or BPA, wherein $R_{10}$ to $R_{13}$ are hydrogen, and $R_{14}$ and $R_{15}$ are methyl groups. Bisphenol-A is represented by structure (IV) as follows

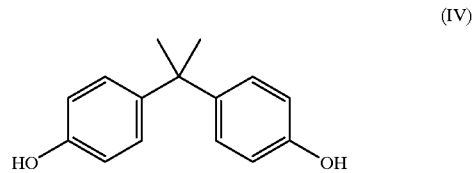

(IV)

The molar ratio of indane structure (I) to structure (II) may vary widely depending on the desired properties. A higher $T_g$ value than that of BPA polycarbonate ($T_g$ of about 150° C.) is observed for the present compositions when the molar ratio of structures (I) to (II) varies from about 100:0 to about 1:99. In the preferred embodiments of this invention the optimal molar ratio of structure (I) to structure (II) ranges from about 100:0 to about 50:50. In the most preferred embodiment, the ratio is about 100:0 providing a $T_g$ of about 200° C., the highest glass transition temperature ($T_g$) value observed for the present polycarbonate compositions. In general, the magnitude of $T_g$ increases as the relative amount of structure (I) contained in the polycarbonate compositions of the present invention increases.

Alternatively, the relative amounts of structural units (I) and (II) in the polymeric polycarbonate compositions can be represented as mole fractions, where the mole fraction of (II) is given by n, and that of structural unit (I) is 1-n. Most preferably, n has the value of 0 or substantially 0, and about 100% of the polycarbonate composition is an indane homopolymer comprising recurring units of structure (I). As stated above, the highest $T_g$ value is observed for this embodiment. The mole fraction of structure (II) increases relative to that of indane structure (I) as the composition contains increasingly more units of structure (II). Any proportion of structure (I) to structure (II) may be prepared, so long as the composition contains at least 1% of the indane unit (n=0.99). Preferably, the composition will contain from about 0 to about 50 mole percent of structure (II), and the mole fraction of structure (II) will vary between about 0 and about 0.50 (0≦n≦0.50). The mole percentage of the corresponding indane structure (I) will vary accordingly, preferably from about 100% to about 50%.

In the copolycarbonate compositions, the indane structural unit (I) and unit (II) may be randomly dispersed along the backbone, referred to herein as a "random copolymer". Alternatively, where the mole fractions of structures (I) and (II) are both 0.50, the copolymer chain may comprise either randomly distributed units or alternating units of (I) and (II), the latter being referred to herein as an "alternating AB copolymer", "alternating (I):(II) copolymer", or "alternating copolycarbonate".

The weight average molecular weight ($M_w$, g/mole) of the linear indane polycarbonate polymers of the present invention may vary widely. In general, the weight average molecular weight ranges from about 40,000 g/mole to about 124,000 g/mole. A high molecular weight (>25,000 g/mole) is desirable to ensure that the integrity of the material is maintained when exposed to high temperatures (>150° C.). The indane-based polymers of the present invention exhibit excellent film properties and remain ductile at these high temperatures, which is indicative of their high molecular weights. It is also known in the art that glass transition temperature ($T_g$) values increase with increasing molecular weight up to a maximum value and then remain constant as molecular weight increases further. Thus, high molecular weight polymers are desirable when thermal properties are important.

The dispersivity for the indane polycarbonates of the present invention ranges between about 1.3 and 3.3. Dispersivity, defined herein as $M_w/M_n$, provides a measurement of the distribution of chain lengths in a polymeric sample. A dispersivity of 1 indicates uniform chain length throughout the sample. $M_n$ is the number average molecular weight of a polymer and is a function of the total number of molecules in a sample and the molecular weight of each molecule.

The most preferred indane polycarbonate homopolymer is derived from 5-hydroxy-3-(4-hydroxyphenyl)-1,1,3-trimethylindane, and the most preferred copolymers contain monomers derived directly or indirectly from 5-hydroxy-3-(4-hydroxyphenyl)-1,1,3-trimethylindane and bisphenol-A. The corresponding structures (I) and (II) for the most preferred compositions, wherein $R_1$, $R_2$, $R_5$, $R_6$, and $R_8$ to $R_{13}$ are hydrogen, and $R_3$, $R_4$, $R_7$, $R_{14}$, and $R_{15}$ are methyl groups, are represented by the following structures (IA) and (IIA)

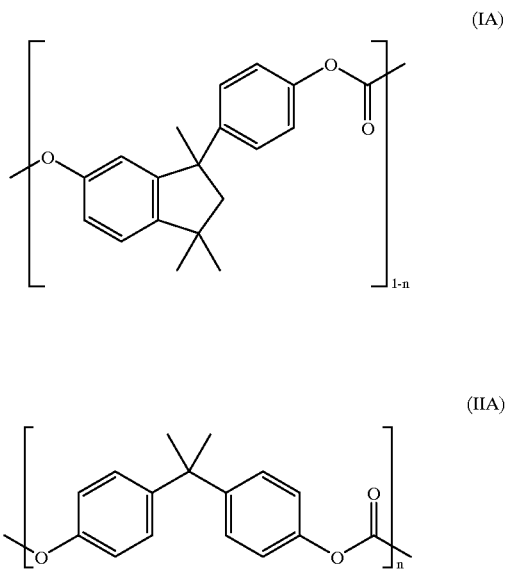

(IA)

and

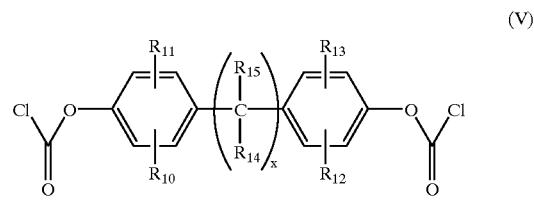

(IIA)

wherein n is from about 0 to about 0.99.

The AB copolymer composition of the present invention, wherein indane structure (I) and structure (II) alternate in the polymeric chain backbone and the mole fraction of each unit is 0.50 (n=0.50), can be conveniently prepared by a conventional condensation polymerization reaction. In this reaction, nearly equimolar amounts of an appropriately substituted aromatic bischloroformate compound of the formula (V)

(V)

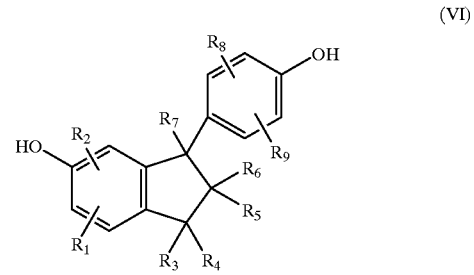

wherein $R_{10}$ to $R_{15}$, and x are defined above, and an appropriately substituted indane bisphenol compound of the formula (VI)

(VI)

wherein $R_1$ to $R_9$ are defined above, are combined. The molar amount of bischloroformate derivative (V) slightly exceeds that of the indane bisphenol compound (VI) in order to produce chloroformate end groups that are later capped with a monophenol. Initially, in this process, the indane compound of formula (VI) is combined in an inert atmosphere, such as in argon, with 4-N,N-dimethylaminopyridine (DMAP) in methylene chloride. The reaction mixture is heated, and a solution of the aromatic bischloroformate (V) in methylene chloride is added over a period of about three hours. During the addition, the reaction mixture is maintained at reflux at a temperature of about 50° C., then stirred for an additional hour. An excess of 4-cumylphenol is then added and the solution stirred for an additional hour.

The methylene chloride solution containing the polymer may then be washed with a 1.0 M aqueous solution of hydrochloric acid, then water and brine. The resulting polymer solution, in $CH_2Cl_2$, can then be dried over $MgSO_4$, followed by concentration using a rotary evaporator. The polymer is isolated by pouring the solution dropwise into vigorously stirred absolute methanol. The alternating AB copolymer can then be collected by filtration followed by drying in vacuo.

Alternatively, the AB copolymer compositions of the present invention described above (alternating structures (I) and (II), n=0.50) can be prepared by combining nearly equimolar amounts of an appropriately substituted indane bischloroformate compound represented by structure (VII)

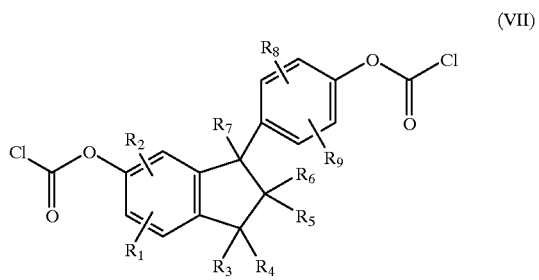

(VII)

wherein $R_1$ to $R_9$ are defined above, and an appropriately substituted biphenol or bisphenol of structure (VIII)

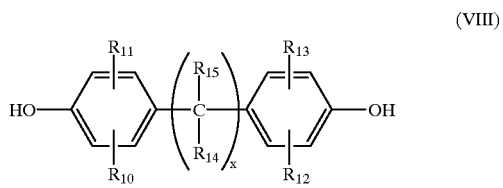

(VIII)

wherein $R_{10}$ to $R_{15}$, and x are defined above. The reaction conditions are similar to those discussed above with respect to the reaction of structures (V) and (VI).

Both the homopolymer of indane structure (I) and random polycarbonate copolymers comprising structures (I) and (II) randomly distributed along the backbone of the polymeric chain can be conveniently prepared by modifying the polymerization method reported by D. J. Brunelle in *Macromol. Rep.* A28 (Supp. 2), 95–102 (1991), which is incorporated herein by reference. Briefly, to produce the random copolymer, phosgene or a phosgene equivalent such as o-nitrophenyl carbonate or p-nitrophenyl carbonate (NPC) is added as a transesterification agent to a mixture of the substituted indane bisphenol compound of formula (VI) above and a substituted biphenol or bisphenol of structure (VIII) above, in methylene chloride. The amount of phosgene or equivalent thereof added is equimolar to the combined molar amounts of structures (VI) and (VIII) contained in the mixture. The process is carried out in an inert atmosphere, such as argon. 4-N,N-Dimethylaminopyridine in toluene is then added to the mixture while stirring to catalyze the reaction, and a clear, bright yellow solution is produced. The solution is stirred at reflux (~50° C.) for about 5 hours, then the heat is removed while the solution continues stirring under ambient conditions for about 20 additional hours. The polycarbonate copolymer can be isolated by conventional techniques such as pouring the methylene chloride solution into absolute methanol while stirring, followed by filtration and drying in vacuo.

Similarly, the indane polycarbonate homopolymer comprising recurring units of structure (I), wherein n=0, can be prepared using the above method for random copolymers but omitting the compound of structure (VIII) from the reaction. In addition, the appropriately substituted indane bisphenol structure (VI) is combined with an equimolar amount of phosgene or its equivalent during the process.

Indane bisphenol compounds for use in the practice of this invention can be obtained commercially or prepared by reacting the corresponding indanamine with sodium nitrite in the presence of aqueous acid as described by J. C. Wilson, *Journal of Polymer Science: Polymer Chemistry Edition* 13, 749 (1975), which is incorporated herein by reference. Also, see U.S. Pat. No. 2,979,534, which is also incorporated herein by reference. The indanamine can be prepared by the method described by J. C. Petropoulos and J. J. Fisher, *J. Amer. Chem. Soc.* 80, 1938 (1958) from the corresponding carboxy indane compound, which is incorporated herein by reference. Appropriately substituted bischloroformate structures (V) and (VII) can be prepared from the corresponding biphenol or bisphenol, methylene chloride, and phosgene by the method described for BPA by Brunelle et al. in *Polymer Int'l* 37, 179–186 (1995), which is also incorporated herein by reference.

The remaining reactants and reagents used in the above reactions are readily available materials. Such materials can be conveniently prepared in accordance with conventional preparatory procedures or obtained from commercial sources. Deuterated compounds for use in the preparation of deuterated indane-based polycarbonates may be prepared using deuterated reactants in the aforementioned reactions.

The invention is illustrated by the following examples but is not limited to the specific embodiments contained therein.

EXAMPLE 1

AB Copolycarbonate

Copolymer of Alternating Units Derived from 5-Hydroxy-3-(4-hydroxyphenyl)-1,1,3-trimethylindane and Bisphenol-A (Structures -IA:IIA:IA:IIA-)

In a two-neck round bottom flask, equipped with a stirrer, a reflux condenser, and an addition funnel, 5-hydroxy-3-(4-hydroxyphenyl)-1,1,3-trimethylindane (670.9 mg, 2.50 mmol), 4-N,N-dimethylaminopyridine (DMAP) (623.8 mg, 5.11 mmol), and 10 ml of methylene chloride were stirred under ambient conditions for 10 minutes. The addition funnel contained a solution of BPA bischloroformate (901.3 mg, 2.55 mmol) in 13 ml $CH_2CH_2$. The system was sealed, purged with argon and kept under an atmosphere of argon for the remainder of the reaction. At this time the heat was turned on and addition of the chloroformate solution was initiated. The reaction was maintained at reflux (~50° C.) while the chloroformate solution was added over three hours. The reaction was then stirred for one additional hour. 4-Cumylphenol (107.6 mg, 0.51 mmol) was added, and the solution was stirred for an additional hour.

The methylene chloride solution containing the polymer was washed with a 1.0 M aqueous solution of hydrochloric acid, then water and brine. The resulting polymer solution in methylene chloride was dried over $MgSO_4$, then concentrated to approximately 20 ml on a rotary evaporator. The polymer was isolated by pouring this solution dropwise into a vigorously stirred volume of absolute methanol (250 ml). The polymer was collected by filtration and dried in vacua for 72 hours, and a fine white powder resulted. A yield of 0.84 g (61%) was obtained. The weight average molecular weight ($M_w$) of the polymer, as determined by gel permeation chromatography relative to polystyrene, was 124 kg/mole, with a dispersivity ($M_w/M_n$) of 1.6. This polymer produced a clear, ductile thin film when cast from a chloroform solution (~100 mg polymer in 6 g $CHCl_3$). The properties of the alternating copolycarbonate are listed in Table I below.

EXAMPLE 2

Random Copolycarbonate Derived from 5-Hydroxy-3-(4-hydroxyphenyl)-1,1,3-trimethylindane and Bisphenol-A (Structures IA:IIA)

To produce the random copolycarbonate, BPA (514.2 mg, 2.25 mmole), 5-hydroxy-3-(4-hydroxyphenyl)-1,1,3-trimethylindane (738.1 mg, 2.75 mmole) and o-nitrophenyl carbonate (1.52 g, 5.00 mmole) were stirred in methylene chloride (10 ml) for 10 minutes in a two-neck round bottom flask equipped with a stirrer and a reflux condenser. 4-N,N-Dimethylaminopyridine (DMAP) (250 μl of a 0.10 M solution in toluene) was added, and the solution clarified and turned bright yellow. The solution was stirred at reflux (~50° C.) for 5 hours. The heat was then removed. The solution continued stirring under ambient conditions for 20 hours longer.

The polymer was isolated by pouring the methylene chloride solution into a vigorously stirred volume of absolute methanol (250 ml). The precipitated polymer was collected on a Büchner funnel. To remove any last traces of o-nitrophenol by-product from the polymer, a chloroform solution containing the polymer was prepared, and the polymer was reprecipitated from absolute methanol twice more. The polymer was collected by filtration and dried in vacuo for 72 hours. This resulted in a fine white powder, yield 1.10 g (79.7%), with a weight average molecular weight ($M_w$) of 40.5 kg/mole and a dispersivity ($M_w/M_n$) of 1.9. The polymer produced a clear, ductile film when cast from a chloroform solution (~100 mg polymer in 6 g $CHCl_3$). The properties of the copolycarbonate are listed in Table I below.

EXAMPLE 3

Homopolycarbonate Derived from 5-Hydroxy-3-(4-hydroxyphenyl)-1,1,3-trimethylindane (Structure -IA-)

The procedure of Example 2 was followed except that no BPA was added to the reaction process. 5-Hydroxy-3-(4-hydroxyphenyl)-1,1,3-trimethylindane (1.61 g, 6.0 mmol) and o-nitrophenylcarbonate (1.827 g, 6.01 mmol) in 25 ml methylene chloride were stirred under an argon atmosphere. A solution of 4-N,N-dimethylaminopyridine (DUMP) in toluene (500 μl of a 0.10 M solution) was added, and heat was applied to the flask. Upon adding the DMAP solution the reaction mixture changed from an off-white slurry to a clear, yellow solution. The solution was stirred at reflux (~55° C.) for 6.5 hours, after which it was stirred at ambient temperature for an additional 17 hours.

The polymer was isolated by precipitating the methylene chloride solution into 100 ml of methanol followed by filtering to recover the polymer. It was reprecipitated two more times from chloroform into methanol, collected and dried in vacuo. A fine white powder was obtained, and the product yield was 1.42 g (80%). The weight average molecular weight ($M_w$) of the isolated polymer was 39.3 kg/mole with a dispersivity ($M_w/M_n$) of 3.3. The polymer produced a clear, ductile film when cast from a chloroform solution (~100 mg polymer in 2 ml $CHCl_3$). The properties of the homopolycarbonate are listed in Table I below.

EXAMPLES 4–10

Random Copolycarbonates Derived from 5-Hydroxy-3-(4-hydroxyphenyl)-1,1,3-trimethylindane and Bisphenol-A (Structures IA:IIA)

The procedure of Example 2 was repeated except that the proportions of BPA and 5-hydroxy-3-(4-hydroxyphenyl)-1,1,3-trimethylindane were varied to produce several random copolycarbonates containing structural units IA and IIA. Compositions having the following mole percentages (IA:IIA) were prepared: 5:95; 25:75; 50:50; 60:40; 65:35; 75:25; and 80:20. The properties of the products are listed in Table I below.

Thermal Analysed

Thermal analyses of the polycarbonate polymers of the present invention were performed with a Perkin Elmer Differential Scanning Calorimeter (DSC) 7 equipped with Pyris software. Preweighed samples were sealed in an aluminum pan that was placed in the furnace of the DSC. Each sample was heated from 50° C. to 250° C. at a rate of 10 degrees per minute. The furnace was then rapidly cooled to 50° C., and each sample was held at 50° C. for 15 minutes. The heating/cooling process was repeated for each sample under the same conditions a second time. The change in heat flow to the sample chamber was determined relative to a reference chamber that contained an empty aluminum pan. A graph of heat flow vs. temperature was prepared for each sample, and the $T_g$ value was calculated as the inflection point on the plotted curve for the second heating step.

The following Table I summarizes the data obtained for the above Examples.

TABLE 1

Properties of Indane Polycarbonates

| | $M_w$ (g/mole) | $M_w/M_n$ | Mole % (IA:IIA) | $T_g$ (° C.) | Film (Clear) |
|---|---|---|---|---|---|
| Example 4 | 41,500 | 3.0 | 5:95 | 151.9 | Ductile |
| Example 5 | 52,600 | 2.9 | 25:75 | 163.6 | Ductile |
| Example 1 Alternating | 124,000 | 1.6 | 50:50 | 181.2 | Ductile |
| Example 6 Random | 62,400 | 1.6 | 50:50 | 175.7 | Ductile |
| Example 2 | 40,500 | 1.9 | 55:45 | 176.7 | Ductile |
| Example 7 | 66,000 | 2.0 | 60:40 | 182.2 | Ductile |
| Example 8 | 66,400 | 1.7 | 65:35 | 181.0 | Ductile |
| Example 9 | 42,200 | 1.3 | 75:25 | 187.4 | Ductile |
| Example 10 | 40,900 | 1.3 | 80:20 | 188.2 | Ductile |
| Example 3 | 39,300 | 3.3 | 100:0 | 199.9 | Ductile |

As can be seen from Table I, the glass transition temperature values for the indane-based polycarbonate compositions of the present invention increase as the mole percentage of the indane-based monomer (structure I or IA) increases. Note that the alternating 50:50 copolycarbonate has a higher glass transition temperature and much higher molecular weight than the corresponding 50:50 random copolycarbonate. One explanation for the observed differences may be the use in the examples of a different synthetic method for the preparation of the alternating copolymer than for the random copolymers. However, all the transition glass temperature values for the indane polycarbonates are significantly higher than those for BPA polycarbonates having comparable molecular weights, i.e. 142.9° C. and 151.2° C. for commercial samples of LEXAN® OQ grade and 100 grade resins, respectively.

In addition, like SBI-based polycarbonates, the indane-based homopolycarbonates exhibit a higher $T_g$ with respect to polycarbonates containing monomers derived from biphenol or bisphenol, such as BPA. However, by contrast to homopolymers formed from SBI, the mechanical strength of the indane bisphenol-based homopolymers of the present invention is not sacrificed, and the materials remain ductile.

The clear indane-based homopolymer and copolycarbonate compositions of the present invention demonstrate improved thermal and mechanical behavior over known BPA polycarbonates, BPA/SBI polycarbonates, and SBI homopolymers. The linear indane polycarbonates of the present invention can therefore be used in high temperature processing applications where the aforementioned known polymers cannot. In addition, the indane polycarbonates of the present invention exhibit improved optical properties over known polycarbonate compositions.

While the invention has been particularly shown and described with reference to the preferred embodiments thereof, it will be understood by those skilled in the art that other changes in form and details may be made therein without departing from the spirit and scope of the invention.

We claim:

1. A linear indane polycarbonate polymer comprising structural units having the formulas (IA) and (IIA)

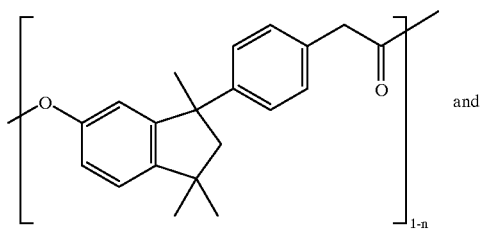

and

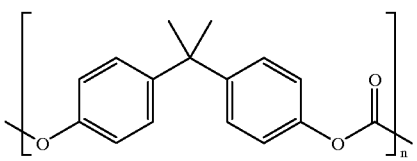

(IIA)

wherein n is the mole fraction of structure (IIA) having a value of about 0.50; wherein said structural units (IA) and (IIA) alternate; and wherein said polymer has a glass transition temperature value of at least 151° C.

2. A linear indane polycarbonate polymer comprising structural units having the formulas (IA) and (II)

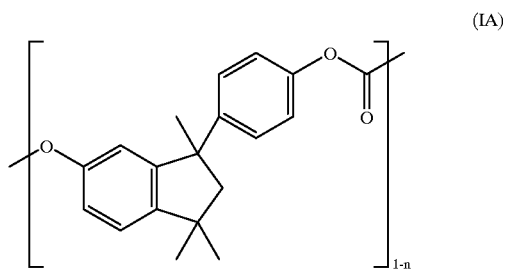

and

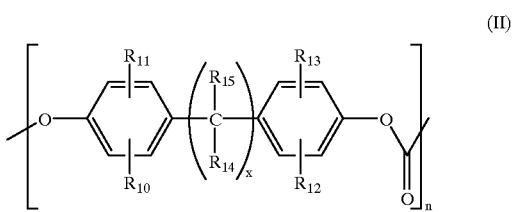

wherein n is the mole fraction of structure (II) having a value of about 0.50; x is 0 or 1;
wherein said structural units (IA) and (II) alternate; wherein said polymer has a glass transition temperature value of at least 151° C.

3. The polymer of claim 2, wherein x is 0.
4. The polymer of claim 2, wherein x is 1.

* * * * *